May 11, 1926.

G. W. TOPLIFF ET AL

PHOTOGRAPHIC SHUTTER

Filed Feb. 4, 1924

INVENTORS
GEORGE W. TOPLIFF
CARL BORNMANN
BY
*Philip S. Hopkins*
ATTORNEY

INVENTOR
GEORGE W TOPLIFF
CARL BORNMANN
BY
*Philip S. Hopkins*
ATTORNEY

Patented May 11, 1926.

1,584,408

UNITED STATES PATENT OFFICE.

GEORGE W. TOPLIFF AND CARL BORNMANN, OF BINGHAMTON, NEW YORK, ASSIGNORS TO ANSCO PHOTOPRODUCTS, INCORPORATED, OF BROOME COUNTY, NEW YORK.

PHOTOGRAPHIC SHUTTER.

Application filed February 4, 1924. Serial No. 690,479.

Our invention relates to photography and has to do particularly with photographic shutters for cameras.

A familiar type of photographic shutter in general use today comprises besides the lens mount, shutter leaves and mechanism for operating the same, devices for regulating the various speeds at which an exposure may be made. Such shutters are also provided with a diaphragm of one type or another by means of which the effective aperture of the lens is controlled. These shutters are usually provided on the face thereof with speed indicating characters such as "T" (indicating time exposure) and "B" (indicating bulb exposure) and "25", "50" and "100" (indicating the various shutter speeds for instantaneous exposures or "snapshots" in the fractional parts of a second). There may be more or less of these indicating characters designating faster or slower speeds than those above indicated, but those mentioned are illustrative and sufficient for a description of this invention.

It is a well known principle of photography that in using a shutter of the character described both the speed controlling element and the diaphragm aperture must be taken into consideration and properly adjusted when making an exposure. For instance, when the speed controlling element is set for a high speed exposure or "snapshot" say at 100, the diaphragm aperture should be comparatively large to admit the maximum amount of light consistent with the depth to be obtained in the photograph. When the shutter is set for slower speeds, however, as "50" or "25", the diaphragm should, under ordinary light conditions, be adjusted to a relatively smaller aperture to increase the depth in the picture. Similarly when the speed controlling element is set for bulb or time exposures the diaphragm should be adjusted to render the aperture still smaller, such as F. 22. The theory of this is well known to those skilled in the art and therefore requires no further detailed explanation here.

Heretofore it has been necessary in the use of shutters of this type to make the two adjustments spoken of, one for adjusting the speed control and one for adjusting the diaphragm. It is the primary object of this invention to provide means whereby both of these adjustments or operations are accomplished simultaneously and automatically by one setting.

A further object is to provide a connection between the speed controlling element and the diaphragm adjusting element whereby movement of one will result in the movement of the other.

Another object is to provide a shutter of the character described with a single operating member for adjusting the speed control and the diaphragm.

It is also an object to make this improvement in such a way as not to change materially the appearance or operation of the shutter.

More specifically our object is to provide a photographic shutter which when adjusted for the various instantaneous exposures, automatically and simultaneously adjusts the diaphragm to correspondingly comparatively large apertures and when the shutter is set for bulb or time exposures the diaphragm is similarly automatically adjusted to relatively smaller apertures.

A further and important object is to provide a shutter with two settings only, one for time exposures, and one for instantaneous exposures at substanially $\frac{1}{25}$ of a second, and to provide means whereby the setting of said shutter to "time" or "instantaneous" automatically adjusts the diaphragm to a correspondingly small and large aperture.

It will be readily seen from the foregoing that our invention contemplates a shutter which will positively eliminate forgetfulness and carelessness on the part of the operator in adjusting his shutter properly for an exposure. This is a highly desirable feature in that it renders the shutter very simple in operation and requires no study or skill on the part of the operator in its use. Other objects and advantages in details of construction and operation will appear as the description proceeds, reference being had to the accompanying drawings wherein like reference numerals indicate like parts.

Figure 1:
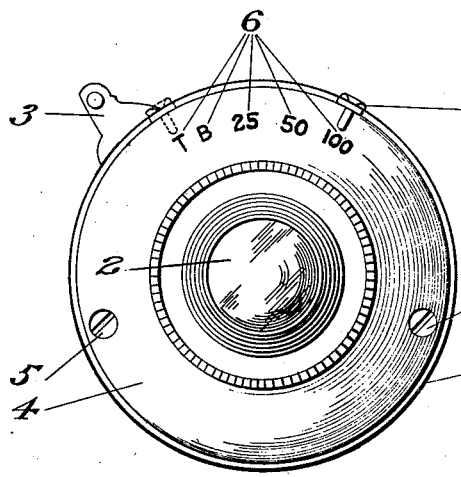
Figure 1 is a face view of a shutter illustrating our invention; the controlling element being shown set for instantaneous exposure or snapshot at $\frac{1}{100}$ of a second. It is also shown in dotted lines set for time exposures.

Referring now particularly to Figures 1 to 4 we have indicated generally by the reference numeral 1 a photographic shutter provided with a lens 2; 2ª refers to the usual shutter leaves. The face plate 4 is mounted on the front of the shutter by means of screws 5 or by any other suitable means, and is provided on the upper part of its face with speed indicating characters 6. As heretofore explained, these characters 6 may vary in number and kind according to the type of shutter mechanism used and usually include the letter "T" indicating time exposure, and the letter "B" indicating bulb exposure, and the numbers "25", "50" and "100" indicating respectively fractions of a second during which the shutter will remain open for making the exposure.

The shutter 1 also includes the diaphragm here indicated by the reference numeral 7 (see Figs. 5 to 7) and which may be of the iris type shown or of any other suitable design. "8" has reference to the diaphragm adjusting ring which is usually placed on the back of the shutter and which has connection with the diaphragm so operating that when the ring is turned in one direction the light aperture will be reduced in size and when moved in the opposite direction, will enlarge such aperture.

In the drawings illustrating this invention we have shown a shutter diaphragm of the iris type having a plurality of pivoted leaves 7 connected in any suitable manner (not shown) with the ring 8, the leaves cooperating to define a light aperture or opening in the center of the shutter. The construction of this diaphragm is well known in the art as is its operation. Suffice it to say here that rotation of the ring 8 in one direction causes the leaves 7 to close toward the center reducing the size of the aperture and when moved in the opposite direction to open from the center, thus enlarging the aperture. Our invention contemplates the use of other types of shutter diaphragms than the iris and we do not limit ourselves, therefore, to the kind shown which is illustrative only.

The ring 8 is provided at one point in its circumference with an operating member or finger piece 9 extending from the ring at the back of the shutter to a point slightly over the face plate 4 of the front. The end 10 of the finger 9 is turned inwardly over the face plate 4 forming a pointer or indicator member directly above the characters 6 on the face plate.

Encircling the lens mount 11 on the face of the shutter is a cam ring 12 rotatable thereon. This cam ring is provided with an upstanding ear or lug 13 having an opening 14 therethru for the reception of the end 10 of the finger piece or diaphragm adjusting member 9. In this way it will be seen that the speed controlling element 12 and the diaphragm adjusting element are connected so that operation or movement of one results in similar movement of the other.

Furthermore, as will be obvious from the drawing and foregoing description, this connection between the speed controlling element and the diaphragm adjusting or controlling element is fixed and permanent. In other words, these two controlling elements are so connected that they can not be disconnected, thus always insuring their simultaneous operation in proper relation to one another and rendering it impossible for an unskilled or careless operator to make an improper relative adjustment of said controlling elements.

The cam ring 12 is enlarged at one point as at 14ª and in such enlarged portion is provided a slot 15 arranged concentric with the center of the ring. One end of this slot is widened forming two openings 16 and 16ª, the latter being nearest the end of the slot and larger than the other. Projecting upwardly from the shutter operating mechanism (not shown) into the slot 15 is the end 17 of a lever which cooperates with the slot 15 and its enlarged portions 16 and 16ª in a manner about to be described.

The construction and operation of these parts is well known and form no part of this invention. In explanation, however, it may be said that when the cam ring 12 is moved to the position shown in Fig. 2 and in full lines in Fig. 3 the lever 17 is confined in the narrow portion of the slot 15 and is consequently so limited in its movement that upon operation of the trigger 3 the shutter is opened and closed by one movement of said trigger for an instantaneous exposure. When the cam ring 12 is moved to the position shown in dotted lines in Fig. 3 however, the lever 17 is permitted a slight downward movement into the opening 16 which in a well known manner permits the shutter leaves 2ª to remain open when the trigger is pushed downwardly, until said trigger is released when the leaves again close. This is known as a bulb exposure. When the cam ring 12 occupies the position shown in Fig. 4 the lever 17 is permitted its maximum movement downwardly in the larger opening 16ª. As is also well known this permits the shutter leaves 2ª to remain open when the trigger 3 is operated, until said trigger is again manipulated when the lever 17 will resume its normal position as shown in Fig. 4 permitting the shutter leaves to close. This movement or setting of the shutter is for time exposures. The details of the lever 17 and the shutter mechanism to which it is connected and by means of which the above operations are accomplished have not been shown in this application inasmuch as they are more or less conventional and well known in the art, and as before stated, form no part of this invention.

Opposite the enlarged portion 14ª of the cam ring 12 is a notch or depression 18 in the periphery of the cam ring. On one side of this depression the periphery of the ring slopes gradually upward to a high point 19 while on the opposite side of the depression the periphery rises abruptly to a high point 20. Cooperating with the cam surfaces formed on the ring 12 by the depression 18 and its adjacent cams 19 and 20 is the projecting end 20ª of a lever extending upwardly thru an opening 21 from the mechanism (not shown) contained within the shutter, controlling the actual speed at which the shutter leaves open and close when operated thru the medium of the trigger 3. A small spring 22 anchored at 23 and extending around a post 24 has its free end bearing against the lever 20ª and normally forces said lever into engagement with the peripheral surface of the cam ring 12.

Figure 2:
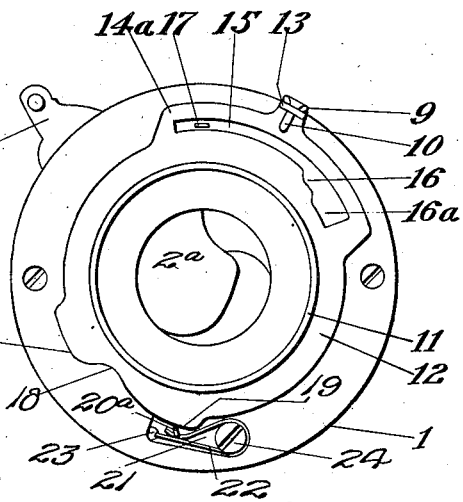
Figure 2 is a face view of our improved shutter with the lens and cover plate removed, the setting of the control element being the same as that shown in Fig. 1.

Explaining the operation of the parts just described; assuming the cam ring 12 to be adjusted to the position shown in Fig. 2 which is for an instantaneous exposure at the high speed of $\frac{1}{100}$th of a second, it will be noted that the lever 20ª is forced outwardly to the limit of its movement and against the action of the spring 22, by the high point 19 of the sloping cam surface adjacent the depression 18. As is well known such position of the lever 20ª places the mechanism for actuating the leaves 2ª under great tension so that the opening and closing of said leaves may be accomplished at the high speed indicated, namely $\frac{1}{100}$th of a second. Movement of the cam ring 12 to the position shown in full lines in Fig. 3 which is the setting for an instantaneous exposure at $\frac{1}{25}$th of a second, brings the lever 20ª into the depression 18 in which position it permits the mechanism controlling the shutter leaves 2ª to open and close said leaves at a retarded rate of speed for the slower exposure of $\frac{1}{25}$th of a second upon manipulation of the trigger 3. Obviously, it will be seen that if the controlling ring 12 is moved to a position intermediate "100" and "25" to the position for the $\frac{1}{50}$th of a second exposure, the lever 20ª will be engaged by the sloping surface of the cam between the depression 18 and the high point 19. It will be readily understood that in this position the speed controlling mechanism for the leaves 2ª will be only slightly retarded to permit the proper length of exposure.

Figure 3:
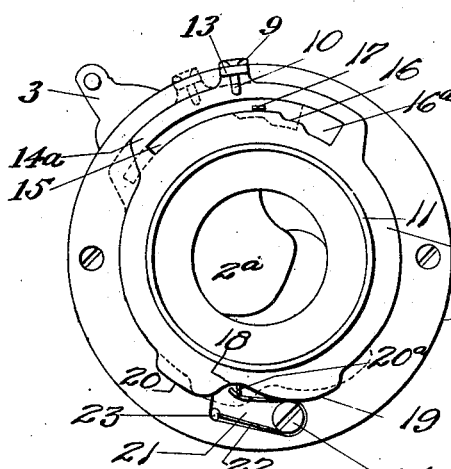
Figure 3 is similar to Fig. 2 showing the controlling element in full lines set for a speed of $\frac{1}{25}$ of a second. The element is also shown in dotted lines in this figure in the position it would assume when set for bulb exposure.
Figure 4:
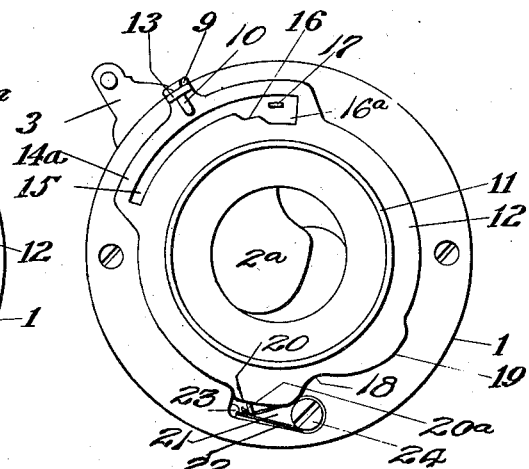
Figure 4 is similar to Fig. 2 showing the controlling element set in position for time exposure.

Again, assuming the cam ring 12 to be adjusted either to the position shown in dotted lines in Fig. 3 (which is for bulb exposure) or to the position shown in Fig. 4 (which is for time exposure) it will be seen that the lever 20ª is engaged by the high point 20 of the other cam surface adjacent the depression 18. As before explained, the lever 20ª is thus held outwardly against the action of the spring 22 in which position the shutter actuating mechanism is placed under high tension so that the opening of the blades 2ª is accomplished at a high rate of speed. This is especially necessary on bulb and time exposures to insure accuracy in measuring the length of the exposure.

As in the case of the lever 17 and the slot 15 the mechanism just described and its attendant parts are not shown in detail for the reason that they are of conventional design and construction and are to be found in many shutters long in common use. The actual speed controlling mechanism represented by the lever 20ª may be either of the dash pot or pump type or of the gear train type, the lever 20 being the only part of such mechanism which enters into the necessary disclosure of our invention.

The operation of our invention as shown in Figs. 1 to 4 is as follows: The diaphragm is so arranged that movement to the left (in these figures) of the controlling ring 8 causes a reduction in the size of the aperture, and the finger piece 8 being connected with the speed controlling cam ring 12 in the manner shown or in any other desired manner, the operator desiring to take a time exposure moves the finger piece 9 to the left until the pointer 10 lies over the indication "T" on the face of the shutter. As explained before, such movement sets the cam ring 12 in a position relative to levers 17 and 20ª which will permit the operation of the shutter for time exposure upon manipulation of the trigger 3 in the usual manner. Such movement of the finger piece 9 simultaneously and automatically rotates the diaphragm adjusting ring 8 to the left which, as heretofore explained, reduces the diaphragm aperture to a relatively small opening, as for instance F. 22. It will be readily understood from the foregoing movement of the finger piece 9 to the right will successively permit exposures of bulb $\frac{1}{25}$th, $\frac{1}{50}$th and $\frac{1}{100}$th of a second as desired and simultaneously with such setting the ring 8 will cause the diaphragm aperture to progressively enlarge. One adjustment, therefore, on the part of the operator accomplishes the double purpose of setting the shutter for the desired speed and the diaphragm to the aperture proper and appropriate for that speed.

The speed controlling element frequently referred to in the foregoing description and appearing in the claims appended hereto, includes the cam ring 12 and levers 17 and 20ᵃ. The speed indicating characters and settings referred to include both time and bulb as well as the instantaneous exposures.

Figure 5:
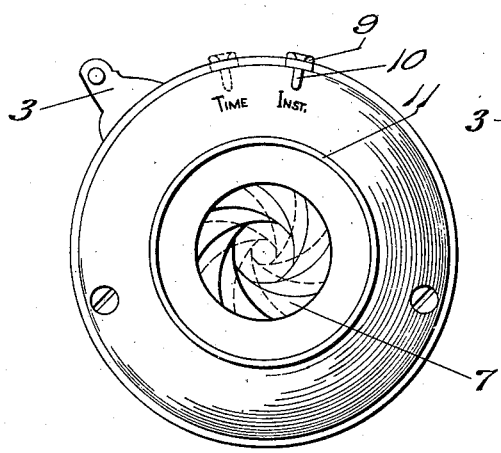
Figure 5 shows a modification of our invention in the form of a shutter provided with two settings only, time and instantaneous, the shutter leaves being removed to show the diaphragm.
Figure 6:
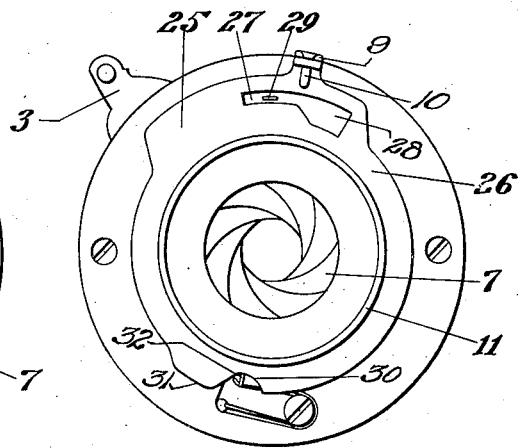
Figure 6 shows this modified shutter set for instantaneous and Figure 7 shows the same set for time exposure.
Figure 7:
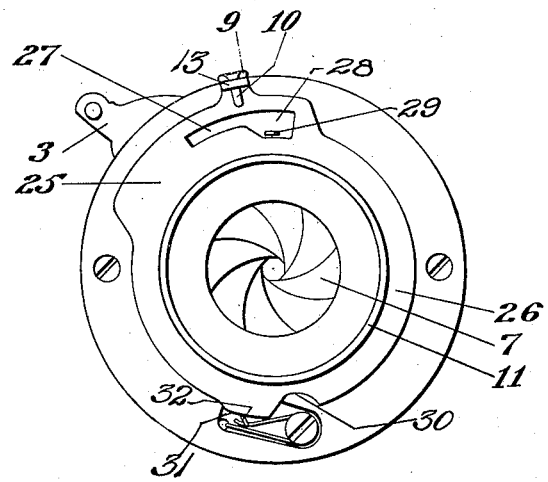
Figure 8:
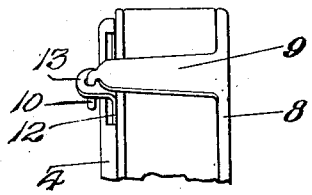
Figures 8 and 9 are details showing clearly the connection between the speed element adjusting means and the diaphragm adjusting means.
Figure 9:
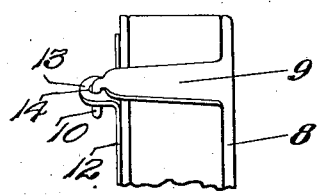

In Figures 5, 6 and 7 we have illustrated a shutter embodying our invention, modified in that there are but two speed settings, time and instantaneous. In this form the enlarged portion 25 of the speed controlling cam ring 26 is provided with a relatively short slot 27 enlarged at one end to form a single opening 28. It will be seen therefore, that the lever 29 has but two operative positions, one for instantaneous exposures (shown in Fig. 6) and one for time exposures (shown in Fig. 7), the bulb and higher speeds "50" and "100" having been eliminated. On the periphery of the ring 26, opposite the slot 27, is a depression 30 similar to the depression 18 shown in Figs. 1 to 4. Adjacent the depression 30 is a single abrupt cam surface terminating in the high point 31. The end 32 of a lever identical with lever 20ᵃ engages the periphery of the ring 26 at these points. The depression 30 permits a retarded action in the opening and closing of the shutter leaves to give an instantaneous exposure of approximately $\frac{1}{25}$th of a second. The high point 31 of the cam places the mechanism of the shutter under tension so that when the shutter is operated on time exposure the shutter leaves will open and close at high speed.

The diaphragm controlling ring 8 with its finger piece 9 may be connected to the cam ring 26 in the same manner as in the previous modification.

The operation of this form of our invention is identical with that of the modification first described and needs no further explanation.

From the foregoing description it will be seen that we have devised a new and decidedly improved photographic shutter which is simple in construction, effective in operation and which combines in one operation two important adjustments essential to proper picture taking. Our invention answers the long felt need for a photographic shutter which would automatically perform all necessary adjustments with the least possible expense of time, effort or knowledge on the part of the operator.

It is obvious that our invention is of broad application and susceptible to many changes and modifications without departing from the spirit thereof. We do not limit ourselves, therefore, to the specific embodiments shown and described other than by the appended claims.

We claim:

1. A photographic shutter comprising a casing, blades, a diaphragm, a speed controlling element for said blades and a diaphragm controlling element; the two controlling elements being permanently connected.

2. A photographic shutter comprising a casing, blades, a diaphragm, a speed controlling element for said blades and a diaphragm controlling element; the two controlling elements being permanently interconnected.

3. A photographic shutter comprising a casing, blades, a diaphragm, a rotatable speed controlling cam for said blades; a diaphragm adjusting element, said cam and said adjusting element being permanently connected.

4. A photographic shutter comprising a casing, blades, a diaphragm, a speed control cam for said blades provided with an upstanding operating member, and a diaphragm control ring provided with an operating member, said latter named member having permanent engagement with the first named member.

5. A photographic shutter comprising a casing, blades, a diaphragm, a speed control cam for said blades provided with an upstanding operating member having an opening therethrough, a diaphragm control ring provided with an operating member, said latter named member engaging in said opening whereby the two operating members are connected.

6. A photographic shutter comprising a casing, blades and a speed controlling element for said blades including a cam ring, a concentric slot enlarged at one end in one side of said ring, cam surfaces on the periphery of said ring, said slot and said cam surfaces cooperating to regulate the kind and speed of an exposure, a diaphragm and means thereon connected to said cam ring for adjusting said diaphragm when said ring is moved to any setting.

7. A photographic shutter comprising a casing, blades and a speed controlling element for said blades including a cam ring, a concentric slot enlarged at one end in one side of said ring, cam surfaces on said ring cooperating to regulate the kind and speed of an exposure, a diaphragm and means thereon connected to said cam ring for adjusting said diaphragm when said ring is moved to any setting, said diaphragm adjustment causing a relatively small aperture at one limit of movement of said ring and progressively larger apertures as the ring is moved toward its other limit.

GEO. W. TOPLIFF.
CARL BORNMANN.